(12) United States Patent
Kimura et al.

(10) Patent No.: US 7,271,500 B1
(45) Date of Patent: Sep. 18, 2007

(54) ELECTRICAL ROTATING MACHINE CONTROL UNIT AND POWER GENERATION SYSTEM

(75) Inventors: Mamoru Kimura, Chiyoda-Ku (JP);
Motoo Futami, Chiyoda-Ku (JP);
Masaya Ichinose, Chiyoda-Ku (JP);
Kazumasa Ide, Chiyoda-Ku (JP);
Kazuhiro Imaie, Chiyoda-Ku (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/599,581

(22) Filed: Nov. 14, 2006

Related U.S. Application Data

(63) Continuation of application No. 11/360,874, filed on Feb. 23, 2006, now Pat. No. 7,157,804, which is a continuation of application No. 10/923,195, filed on Aug. 20, 2004, now Pat. No. 7,095,133.

(30) Foreign Application Priority Data

Jan. 13, 2004 (JP) ............................... 2004-004900

(51) Int. Cl.
*H02P 9/10* (2006.01)
(52) U.S. Cl. .............................. 290/52; 290/44; 322/59
(58) Field of Classification Search ................ 318/156, 318/158; 290/7, 8, 43, 44, 52, 54, 55; 322/44, 322/59

See application file for complete search history.

(56) References Cited

U.S. PATENT DOCUMENTS

| | | | | |
|---|---|---|---|---|
| 3,937,974 | A * | 2/1976 | Lafuze | 290/46 |
| 4,041,361 | A | 8/1977 | Cornell | 318/802 |
| 4,400,659 | A * | 8/1983 | Barron et al. | 322/32 |
| 4,982,147 | A | 1/1991 | Lauw | 318/729 |
| 4,994,684 | A | 2/1991 | Lauw et al. | 290/52 |
| 5,422,778 | A * | 6/1995 | Good et al. | 361/92 |
| 5,493,201 | A * | 2/1996 | Baker | 322/10 |
| 5,798,631 | A | 8/1998 | Spee et al. | 322/25 |
| 5,798,632 | A * | 8/1998 | Muljadi | 322/29 |
| 6,486,639 | B1 * | 11/2002 | Montret et al. | 322/29 |
| 6,741,059 | B2 * | 5/2004 | Gokhale et al. | 318/700 |
| 6,784,634 | B2 | 8/2004 | Sweo | 318/727 |
| 6,856,038 | B2 | 2/2005 | Rebsdorf et al. | 290/44 |
| 6,933,625 | B2 | 8/2005 | Feddersen et al. | 290/44 |

FOREIGN PATENT DOCUMENTS

JP 05-284798 10/1993

* cited by examiner

*Primary Examiner*—Bentsu Ro
(74) *Attorney, Agent, or Firm*—Crowell & Moring LLP

(57) ABSTRACT

Because of the necessity of resolver for detecting a rotating position, which is very expensive, and noise suppression of the rotating position signal line on a doubly-fed machine, cost increase of the generator and reduced reliability due to possible failures are inevitable. In order to solve such problem, a generation system in the present invention is equipped with an exciter that estimates the slip frequency of the doubly-fed machine from each primary current $I_1$ and voltage $V_1$ and secondary current $I_2$ and voltage $V_2$ of the doubly-fed machine and excites the secondary of the doubly-fed machine at the estimated slip frequency.

2 Claims, 4 Drawing Sheets

ELECTRICAL ROTATING MACHINE CONTROL UNIT AND POWER GENERATION SYSTEM

CROSS-REFERENCE TO A RELATED APPLICATION

This application is a Continuation and claims priority of U.S. patent application Ser. No. 11/360,874, filed Feb. 23, 2006, now U.S. Pat. No. 7,157,804 B2, which is a Continuation of U.S. patent application Ser. No. 10/923,195, filed Aug. 20, 2004, now U.S. Pat. No. 7,095,133 B2, which claims priority of Japanese Patent Application Serial No. 2004-004900, filed on Jan. 13, 2004.

BACKGROUND OF THE INVENTION

The present invention relates to a rotating electrical machine control unit and power generation system, particular to a control unit and power generation system of a doubly-fed machine.

Doubly-fed machine has conventionally been used as the generator for an aerogeneration system. It is a generator-motor, equipped with 3-phase winding laid in slots provided at equal distance on the stator and rotor, that is operated at variable speed by applying variable-frequency alternating current power particularly to the secondary of the generator-motor. As disclosed in the Japanese Application Patent Laid-Open Publication No. Hei 05-284798 (hereinafter called the Patent Document 1), the doubly-fed machine like the above has a resolver for detecting a rotating position, slip frequency which is the differential between the primary frequency and secondary frequency is calculated, and the output is controlled by a power converter.

[Patent Document 1]

Japanese Application Patent Laid-Open Publication No. Hei 05-284798

SUMMARY OF THE INVENTION

According to the prior art, cost increase of the generator has been inevitable because of the necessity of resolver for detecting a rotating position, which is very expensive, and noise suppression of the rotating position signal line. In addition, the reliability is lower because of increased chances of failure. The present invention is capable of controlling a doubly-fed machine without using a rotor position sensor such as resolver, and accordingly cost increase due to the use of a rotor position sensor such as resolver in a doubly-fed machine can be prevented.

A characteristic of the present invention is to calculate a command value of the voltage to be applied to the rotor winding based on the voltage of the stator winding, current of the stator winding, and current of the rotor winding.

Another characteristic of the present invention is to calculate the information relating to the rotor position based on the voltage of the stator winding, current of the stator winding, and current of the rotor winding.

Other characteristics of the present invention are explained in detail hereunder.

According to the present invention, cost increase due to the use of a rotor position sensor such as resolver in a doubly-fed machine can be prevented.

DETAILED DESCRIPTION OF THE PREFERRED EMBODIMENT

Figure 1:
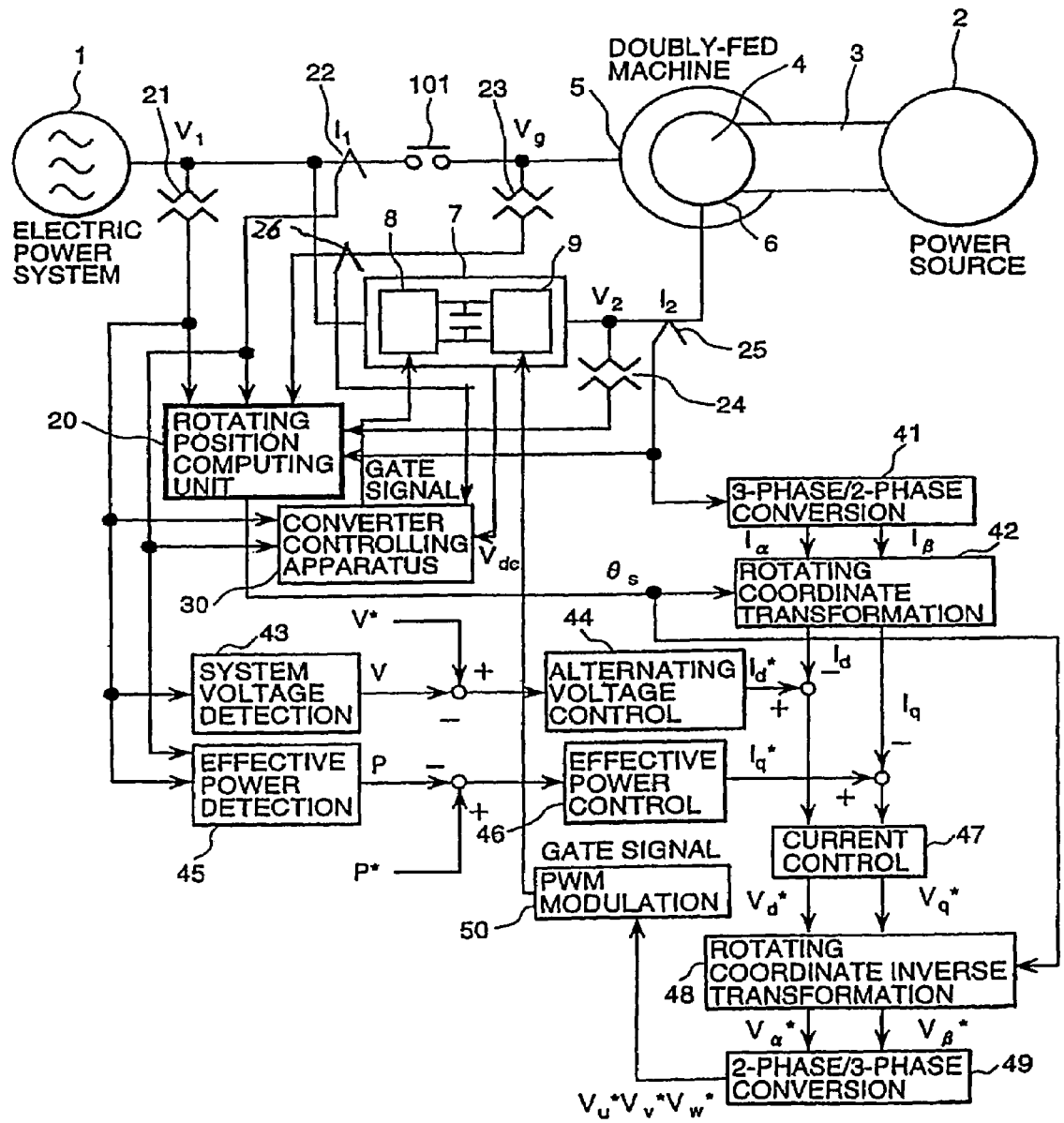
FIG. 1 is a diagram showing a brief construction of an embodiment of the present invention.

An embodiment of the present invention is described hereunder, using figures. FIG. 1 is a diagram showing the overall construction of a doubly-fed machine drive system to which the present invention applies.

As shown in FIG. 1, a doubly-fed machine 4, mechanically connected with a power source 2, is a generator-motor, equipped with 3-phase winding laid in slots provided at equal distance on the stator and rotor, that is operated at variable speed by applying variable-frequency alternating current power particularly to the secondary of the generator-motor, that is, a generator-motor which is controlled by comparing the primary voltage with a control variable in the alternating voltage control 44 so as to adjust the secondary voltage. The stator winding 5 of the doubly-fed machine 4 is connected to the electrical power system 1 via a switch 101.

The rotor winding 6 of the doubly-fed machine 4 is electrically connected with an exciter 7 and the rotor winding 6 is alternatingly excited by the exciter 7. The exciter 7 comprises an indirect alternating current converter, consisting of converter 8 and inverter 9, which once converts alternating current power to direct current power and then converts the direct current power to the alternating power of desired frequency.

The converter 8 is controlled by a converter controlling apparatus 30 that generates a gate signal based on the electric power system voltage $V_1$ detected by a system voltage detector 21, output voltage of the inverter 8 detected by a current detector 26, and direct current voltage $V_{dc}$ of the exciter 7.

The inverter 9 is driven by a gate signal generated by a PWM modulator 50. This gate signal is generated in the circuitry explained below. The secondary current $I_2$ of the doubly-fed machine (current through the stator winding) detected by an exciting current detector 25 is converted into $I_\alpha$ and $I_\beta$ by a 3-phase/2-phase converter 41, and the d-axis current and q-axis current exhibited on a dq-axis rotating coordinate when the rotor position $\theta_s$ obtained from a rotating position calculator 20 is transformed in terms of the coordinate by a rotating coordinate transformer 42 are called $I_d$ and $I_q$, respectively. When the rotor position $\theta_s$ is in the same phase as with the induced electromotive force due to slip, the d-axis current $I_d$ represents the excitation component and the q-axis current $I_q$ represents the torque component.

A practical manner for the above is to convert 3-phase secondary current $I_2$ ($I_{2u}$, $I_{2v}$, $I_{2w}$) into ($I_\alpha$, $I_\beta$, $I_0$) using Expression 1 below on the 2-phase winding ($\alpha$, $\beta$, 0) of the rotor.

$$\begin{bmatrix} I_\alpha \\ I_\beta \\ I_0 \end{bmatrix} = \sqrt{\frac{2}{3}} \begin{pmatrix} 1 & -1/2 & -1/2 \\ 0 & \sqrt{3}/2 & -\sqrt{3}/2 \\ 1/\sqrt{2} & 1/\sqrt{2} & 1\sqrt{2} \end{pmatrix} \begin{pmatrix} I_u \\ I_v \\ I_w \end{pmatrix}$$ [Epression 1]

Next, based on Expression 2, $(I_\alpha, I_\beta, I_0)$ is transformed into a rotating coordinate $(I_d, I_q, I_0)$ using the rotor position $\theta_s$. This is nothing but the definition of a general dq transformation.

$$\begin{bmatrix} I_d \\ I_q \\ I_0 \end{bmatrix} = \sqrt{\frac{2}{3}} \begin{pmatrix} \cos\theta s & -\sin\theta s & 0 \\ \sin\theta s & -\cos\theta s & 0 \\ 0 & 0 & 1 \end{pmatrix} \begin{pmatrix} I_\alpha \\ I_\beta \\ I_0 \end{pmatrix}$$ [Epression 2]

The electric power system voltage $V_1$ detected by the system voltage detector 21 is changed into scalar V by a system voltage detector 43, and the deviation between the voltage control command value V* and V is inputted into an alternating-current voltage controller 44 so as to obtain a d-axis current command value $I_d^*$. The alternating-current voltage controller 44 shall preferably be an ordinary PI controller.

The primary current $I_1$ of the doubly-fed machine 4 (current through the stator winding) detected by a primary current detector 22 and the electric power system voltage $V_1$ are changed into scalar power P by an effective power detector 45, and the deviation between the power control command value P* and P* is inputted into an effective power controller 46 so as to obtain a q-axis current command value $I_q^*$. The effective power controller 46 shall preferably be an ordinal PI controller.

Each deviation between the d-axis current $I_d$ and d-axis current command value $I_d^*$ and between the q-axis current $I_q$ and q-axis current command value $I_q^*$ are inputted into a current controller 47 so as to obtain a d-axis voltage command value $V_d^*$ and q-axis voltage command value $V_q^*$, respectively. The current controller 47 shall preferably be an ordinary PI controller.

From these voltage command values and rotating position $\theta_s$ obtained from the rotating position calculator 20, 2-phase voltage command values $V_\alpha^*$ and $V_\beta^*$ are obtained respectively using an rotating coordinate inverse transformer 48, and also 3-phase voltage command values $V_u^*$, $V_v^*$, and $V_w^*$ are obtained respectively using a 2-phase/3-phase converter. To be concrete, an inverse transformation in Expression 1 and Expression 2 is performed, and then a dq transformation is performed.

The inverter 9 is controlled using these 3-phase voltage command values and gate signal generated by the PWM modulator 50.

Figure 2:
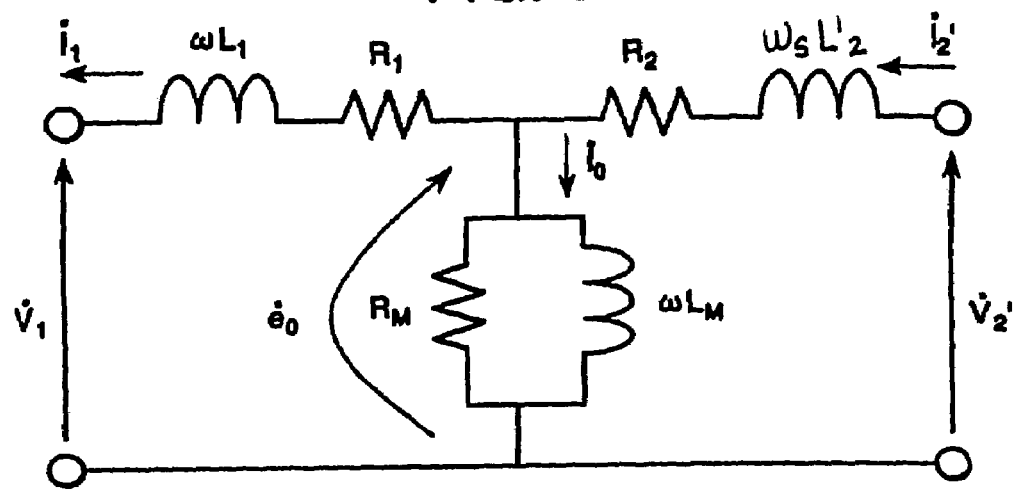
FIG. 2 is a diagram showing an equivalent circuit of a doubly-fed machine.
Figure 3:
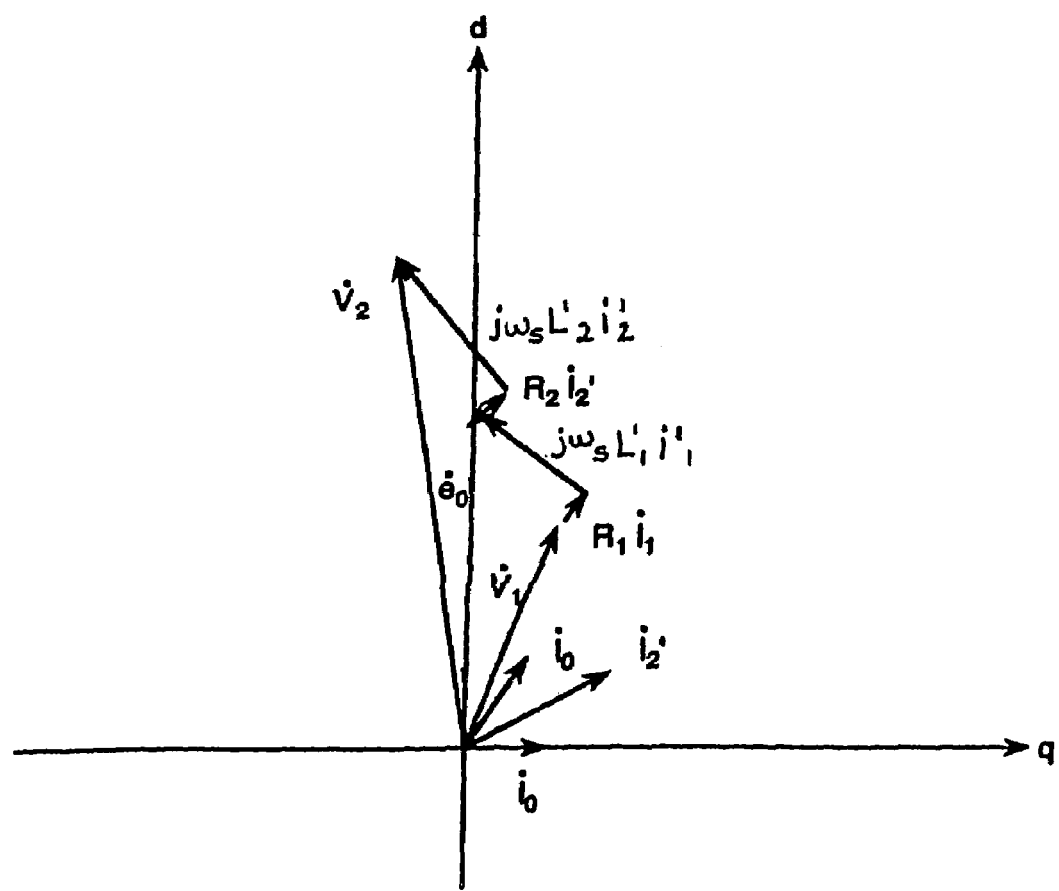
FIG. 3 is a diagram showing vectors based on FIG. 2.

Description about the rotating position calculator 20 is given below, using FIG. 2, FIG. 3 and FIG. 4. In these figures, the same symbol is given to the same component/part as in FIG. 1. FIG. 2 is an equivalent circuit of the doubly-fed machine 4. The voltage equation of this equivalent circuit is expressed as in Expressions 3, 4, 5, and 6.

$$V_1 = (R_1 + j\omega L_1)\dot{I}_1 + \dot{e}_0$$ [Expression 3]

$$V'_2 = \dot{e}_0 - (R'_2 + j\omega_s L'_2)\dot{I}'_2$$ [Expression 4]

$$\dot{e}_0 = \frac{R_M \, j\omega L_M}{R_M + j\omega L_M} \dot{I}_0$$ [Expression 5]

$$\dot{I}_0 = \dot{I}'_2 - \dot{I}_1$$ [Expression 6]

A symbol marked with dot "•" on its top is a scalar and marked with dash """ is a primary conversion value. In the expressions, j is an imaginary unit, $L_1$ is inductance, $R_1$ is primary resistance, $L_2$ is secondary leak inductance, $R_2$ is secondary resistance, $R_M$ is no-load loss resistance, $L_M$ is excitation inductance, $e_0$ is induced electromotive force, $I_0$ is excitation current, $\omega$ is output frequency, and $\omega_s$ is slip frequency. FIG. 3 shows the vector diagram of the equivalent circuit. Finding the slip frequency $\omega_s$ enables to estimate the rotor position. The slip frequency $\omega_s$ is obtained from Expressions 3 to 6 and expressed as in Expression 7.

$$\omega_s = \frac{\frac{R_M \, j\omega L_M}{R_M + j\omega L_M}(\dot{I}'_2 - \dot{I}_1) - R'_2 \cdot \dot{I}'_2 - \dot{V}'_2}{jL'_2 \dot{I}'_2}$$ [Expression 7]

Accordingly, the slip frequency $\omega_s$ can be obtained by inputting the detected electric power system voltage $V_1$, primary current $I_1$, secondary excitation voltage $V_2$, secondary current $I_2$ and system frequency $\omega$ into the rotating position calculator 20. When R<<L applies in Expressions 3 to 7, the primary resistance and secondary resistance can be neglected. A way for finding the slip frequency $\omega_s$ using the secondary excitation voltage $V_2$ has been explained herein, but the voltage command values $V_u^*$, $V_v^*$ and $V_w^*$ can be used instead of the secondary excitation voltage $V_2$.

Figure 4:
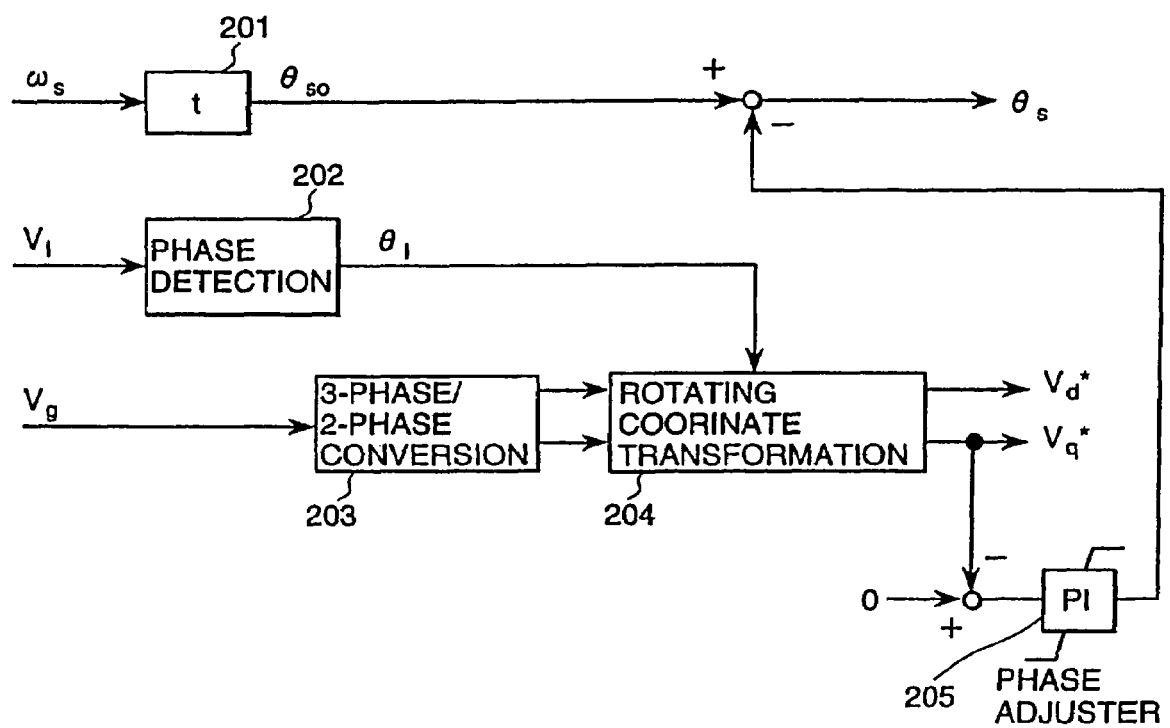
FIG. 4 is a diagram showing part of a rotor position detector.

In order to decide the initial value of the slip frequency $\theta_s$ at the rotor position $\theta_s$ in case the switch 101 is open, the transformation shown in FIG. 4 is performed. Firstly, position information is set to $\theta_{s0}$ by a time multiplier 201. Then, from the electric power system voltage $V_1$, voltage phase $\theta_i$ is obtained by a phase detector 202. The generator voltage $V_g$ are then converted into $V_\alpha$ and $V_\beta$ by a 3-phase/2-phase converter 203 and, from these $V_\alpha$ and $V_\beta$ and the voltage phase $\theta_1$, the d-axis voltage $V_d$ and q-axis voltage $V_q$ are obtained by a rotating coordinate transformer 204. Since the q-axis voltage $V_q$ becomes zero if the electric power system voltage $V_1$ and generator voltage $V_g$ are at the same phase, it is compared with zero and the difference is inputted into a phase adjuster 205. By adding/subtracting its output to/from the position information $\theta_{s0}$, the phase of the rotor position $\theta_s$ is adjusted and accordingly, as the electric power system voltage $V_1$ and generator voltage $V_g$ at the switch 101 become equal, the initial phase of the position information $\theta_s 0$ is decided. Then, when the switch 101 is closed, the output from the phase adjuster becomes zero because of $V_1 = V_g$ and accordingly the routine for deciding the initial phase does not work in the normal generation mode. $\theta_s$ is decided as above.

Figure 5:
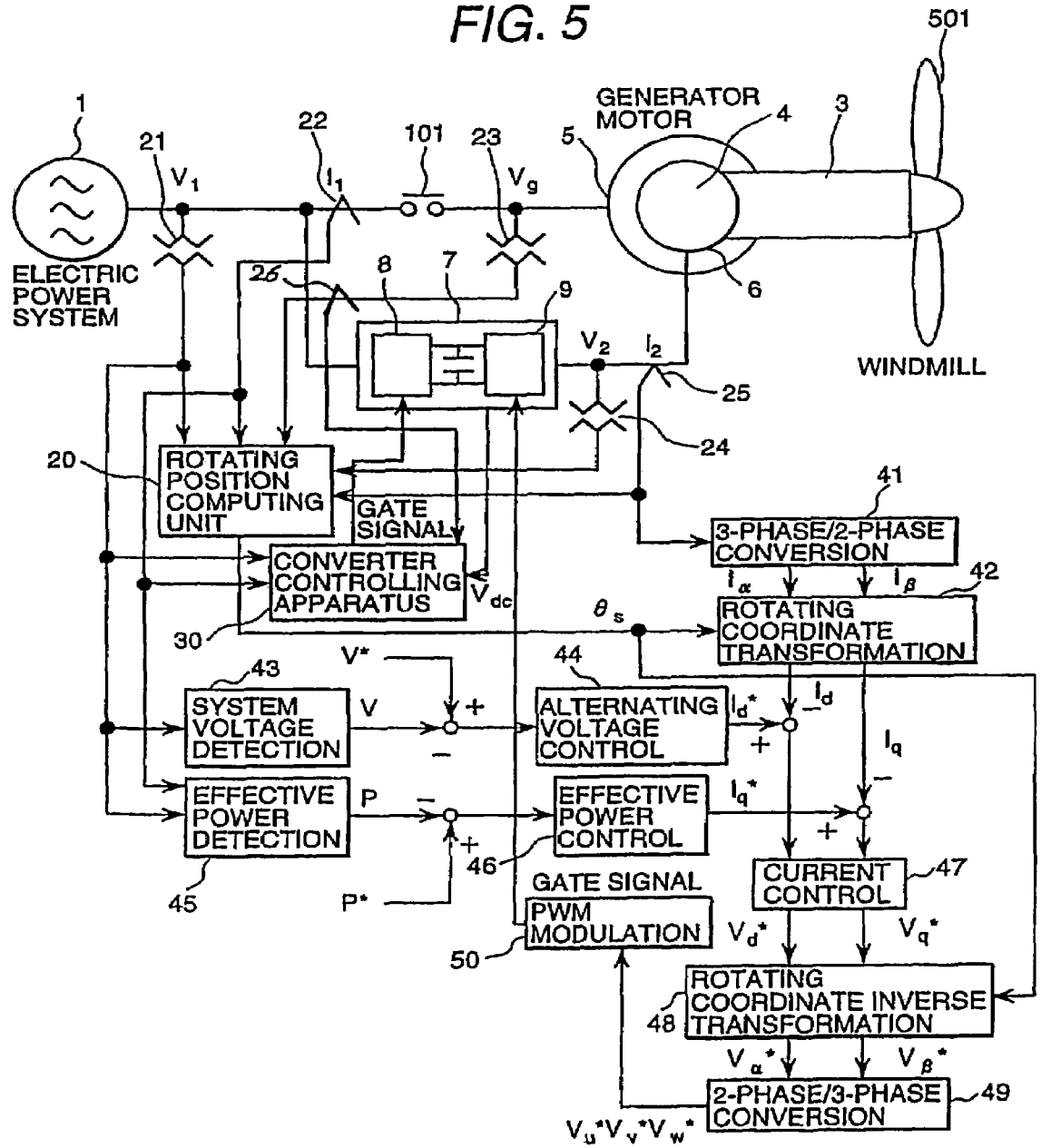
FIG. 5 is a diagram showing an embodiment of the generation system according to the present invention.

FIG. 5 shows an embodiment wherein a windmill 501 is employed as the power source of the present invention. Power source of the invention may include wind power, hydraulic power, engine and turbine, but greater effect of the invention is expected in the case of aerogeneration system of which number of revolutions is very much variable.

According to the above embodiment of the present invention, wherein a doubly-fed machine is controlled without using a rotor position sensor such as resolver, it becomes possible to efficiently control the generator without using a rotor position sensor such as resolver on the doubly-fed machine, and accordingly cost increase of a rotating machine can be prevented. In addition, any noise suppression means is not necessary for the rotor position sensor.

What is claimed is:

1. A power generation system equipped with
   a stator wound a stator winding,
   a rotor wound a rotor winding,
   a stator voltage detector for detecting voltage of the stator winding,
   a stator current detector for detecting the current of the stator winding,
   a rotor current detector for detecting the current of the rotor winding,
   an active power detecting means for detecting an active power based on a voltage obtained from said stator voltage detector, a stator current obtained from said stator current detector, and a rotor current obtained from said rotor current detector, and
   a calculator for calculating a voltage command value of said rotor winding based on said active power obtained from said active power detecting means.

2. A power generation system equipped with
   a stator wound a stator winding,
   a rotor wound a rotor winding,
   a stator voltage detector for detecting voltage of the stator winding,
   a stator current detector for detecting the current of the stator winding,
   a rotor current detector for detecting the current of the rotor winding,
   a voltage command value calculator for calculating a voltage command value for said rotor winding based on a voltage obtained from said stator voltage detector, a stator current obtained from said stator current detector, and rotor current obtained from said rotor current detector, and
   a calculator for calculating a control value based on an active power detected by said stator voltage detector so as to obtain said voltage command value.

* * * * *